Nov. 23, 1926.　　　　　　　　　　　　　　　　　　　1,608,064
O. C. HENRY
AUTOMOBILE SEAT CONSTRUCTION
Filed March 23, 1926　　　2 Sheets-Sheet 1
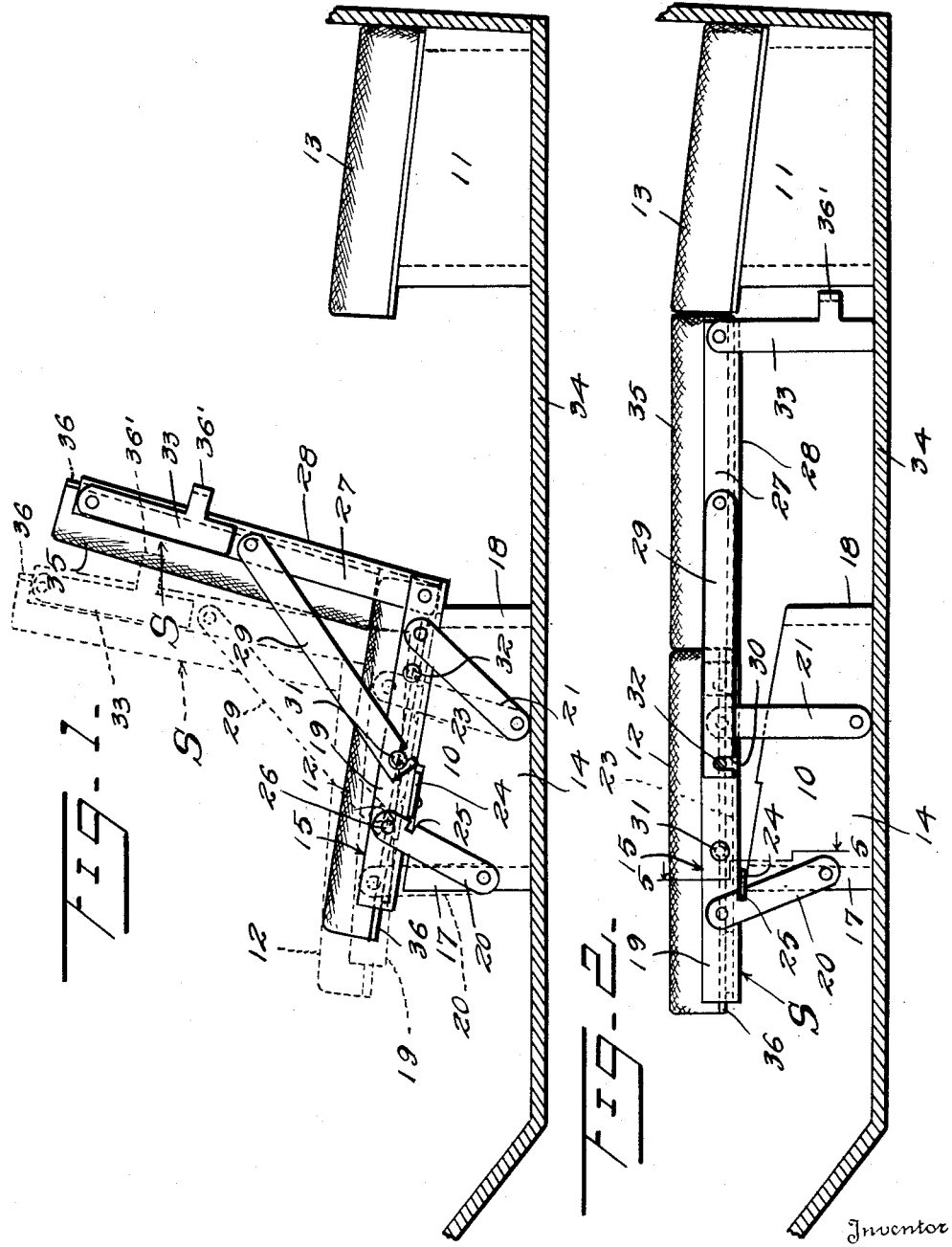
Inventor
Oliver C. Henry,
By Watson E. Coleman
Attorney Nov. 23, 1926.
O. C. HENRY
1,608,064
AUTOMOBILE SEAT CONSTRUCTION
Filed March 23, 1926        2 Sheets-Sheet 2
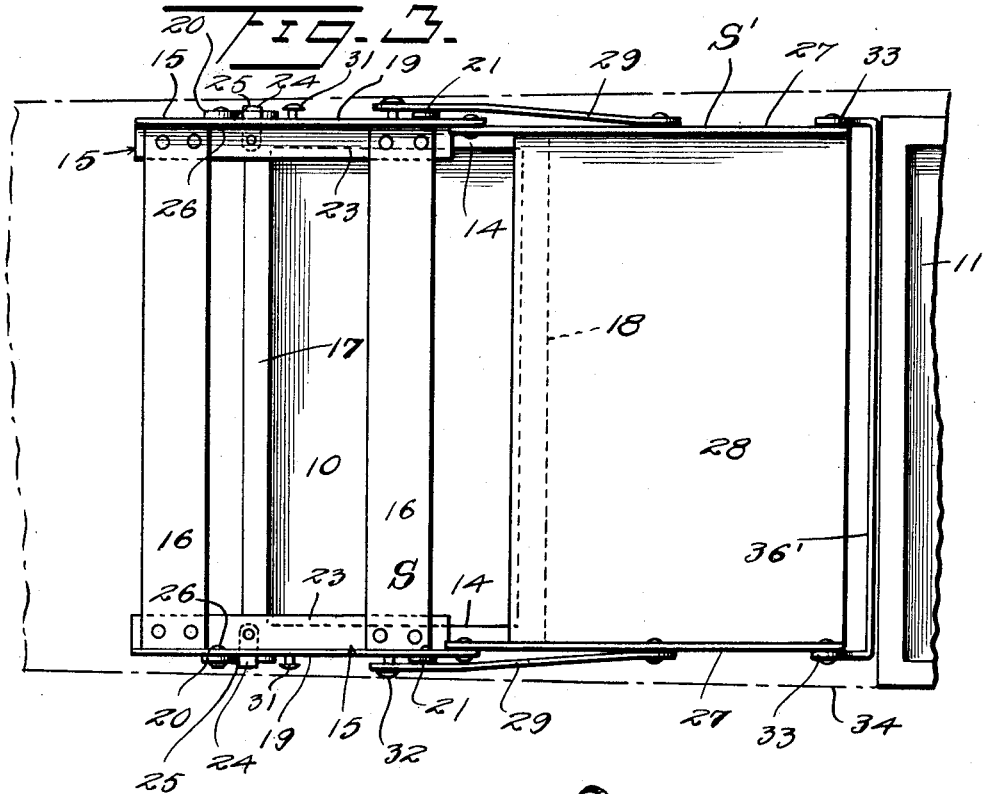
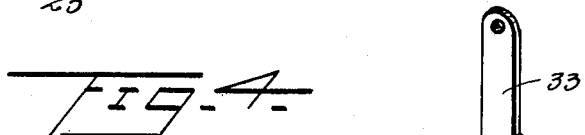
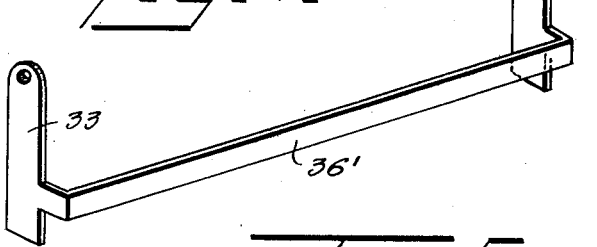
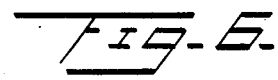
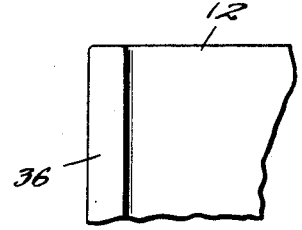
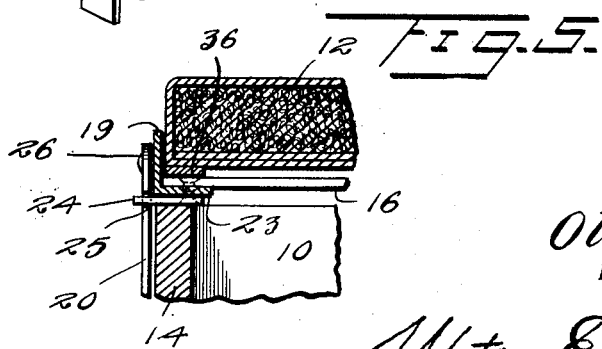
INVENTOR.
Oliver C. Henry
BY
Watson E. Coleman, ATTORNEY.

Patented Nov. 23, 1926.

1,608,064

UNITED STATES PATENT OFFICE.

OLIVER C. HENRY, OF POCATELLO, IDAHO.

AUTOMOBILE SEAT CONSTRUCTION.

Application filed March 23, 1926. Serial No. 96,773.

This invention relates to automobile seat constructions and more particularly to a construction for the front seat of automobiles whereby this front seat may be combined with the rear seat to provide a bed.

An important object of the invention is to provide a construction of this character which is adapted for use with vehicles where the front seat bottom inclines rearwardly when in its normal or seat forming position and contemplates the provision of means for causing this seat bottom to assume a horizontal position, as the seat is shifted forwardly.

A further object of the invention is to provide means for locking the seat when in its forward position in a manner preventing sagging of the seat structure.

A still further object of the invention is to provide a device of this character wherein the lower end of the seat back, which is pivoted to the seat bottom support and is accordingly elevated, may be firmly and rigidly held when the seat back and seat bottom are in aligned position and futher contemplates a construction whereby the seat cushions may be readily shifted upon the platform thus provided so that a continuous bed structure is provided at the rear side of the vehicle.

These and other objects I attain by the construction shown in the accompanying drawings, wherein for the purpose of illustration is shown a preferred embodiment of my invention and wherein:—

Figure 1 is a side elevation of an automobile seat constructed in accordance with my invention showing the same in the normal position;

Figure 2 is a similar view but with the seat in the bed forming position;

Figure 3 is a plan view of the seat and seat back supports showing the construction thereof;

Figure 4 is a perspective of the supporting legs for the upper end of the seat back support when in bed forming position;

Figure 5 is a section on the line 5—5 of Figure 2;

Figure 6 is a view showing the method of binding the seat cushions to prevent wear thereof.

Referring now more particularly to the drawings, the numerals 10 and 11 generally indicate the seat bases of the front and rear seats of a vehicle, respectively. These seat bases may be of the usual hollow construction so as to provide storage compartments for the reception of tools, these compartments being open at their upper ends and accessible when the seat cushions 12 or 13 are removed. The seat base 10 includes end members 14.

As is well known to those familiar with the art, it is common practice to cause the front seats of automobiles to incline downwardly toward the rear edges thereof so that the occupants of the seat may be more comfortably accommodated and the apparent leg room provided be increased. This may be accomplished either by varying the thickness of the seat cushion 12 from front to back or by inclining the upper surface of the seat base from front to back in making the cushion 12 of uniform thickness. The latter construction is herein illustrated.

In accordance with my invention, upon the upper end of the seat base 10, I provide a framework forming a bottom cushion support S and comprising end members 15 formed of angle iron and having the horizontal flange thereof inwardly directed and longitudinal braces 16 which preferably overlie the front and rear walls 17 and 18 of the seat base 10. The vertical flanges 19 of the angle iron side members align with the outer side faces of the end members 14 and are connected thereto adjacent their forward ends by links 20 and adjacent their rear ends by links 21. The links 20 and 21 in their normal position or that position which they assume when the seat bottom is resting upon the upper surface of the seat base, incline rearwardly and are of such length that when the rear links 21 are vertically disposed, the bottom cushion support S is horizontally disposed. The inclination of the link 20, when the bottom cushion support is in its normal position, is less than the inclination of the link 21, so that when the link 21 is vertically disposed, the link 20 is canted forwardly, as more clearly shown in Figure 2. Each end member 15 has pivotally secured to the under surface of the horizontal flange 23 thereof a flat bar 24 which, in the normal position of the cushion support, underlies the flange 23 and may be swung outwardly when the cushion support S is horizontally disposed to engage in a notch 25 formed in the rear face of the associated link 20.

It will be noted that any tendency of the front edge of the seat to sag when the seat